July 5, 1949.　　　J. H. PLOEHN　　　2,474,956
RIM ATTACHING MEANS

Filed June 18, 1947　　　2 Sheets-Sheet 1

*INVENTOR.*
JOHN H. PLOEHN
*BY*
ATTORNEYS

July 5, 1949.   J. H. PLOEHN   2,474,956
RIM ATTACHING MEANS
Filed June 18, 1947   2 Sheets-Sheet 2
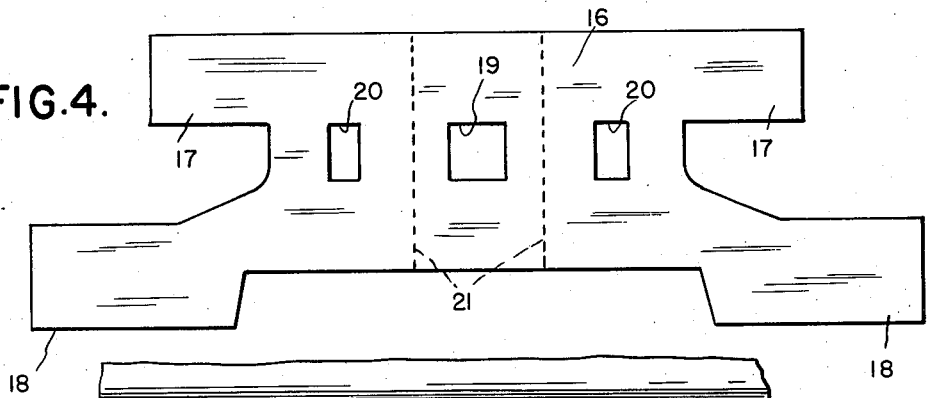
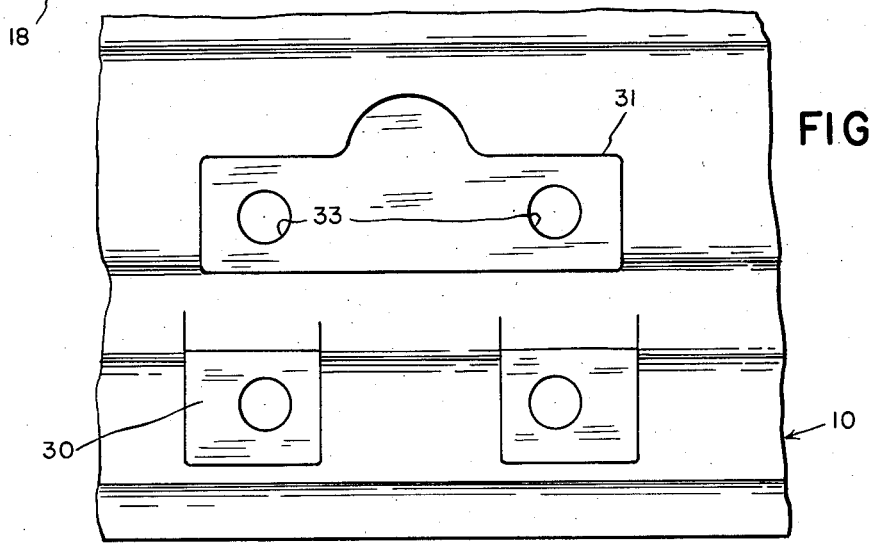
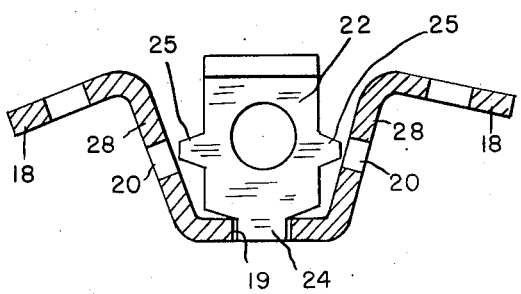
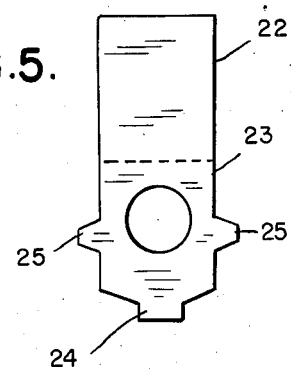
*INVENTOR.*
JOHN H. PLOEHN
BY
Whittemore Hulbert & Belknap
ATTORNEYS Patented July 5, 1949

2,474,956

UNITED STATES PATENT OFFICE 2,474,956

RIM ATTACHING MEANS

John H. Ploehn, Bettendorf, Iowa, assignor to Kelsey-Hayes Wheel Company, Detroit, Mich., a corporation of Delaware Application June 18, 1947, Serial No. 755,355

3 Claims. (Cl. 301—11)

The invention relates to means for attaching tire holding rims to wheel bodies and of that type permitting of attachment in different offset positions. More particularly, the invention relates to that type of attachment means formed of sheet metal elements and of a geometrical form which may be developed by bending a flat sheet metal blank without drawing or stretching the same.

It is the object of the invention to obtain a construction of this type which has greater strength and rigidity than structures of the same general character heretofore produced.

It is a further object to obtain a structure having other improved characteristics and with these objects in view the invention consists in the construction as hereinafter set forth.

In the drawings:

Fig. 3 is a plan view of a portion of the wheel rim viewed on the inner side thereof;

Fig. 4 is a plan view of a sheet metal blank from which one of the attachment members is developed by bending;

Fig. 5 is a plan view of a blank from which a complementary member is developed;

Fig. 6 is a cross section illustrating the manner of assembling the elements respectively formed from the two blanks.

Figure 1:
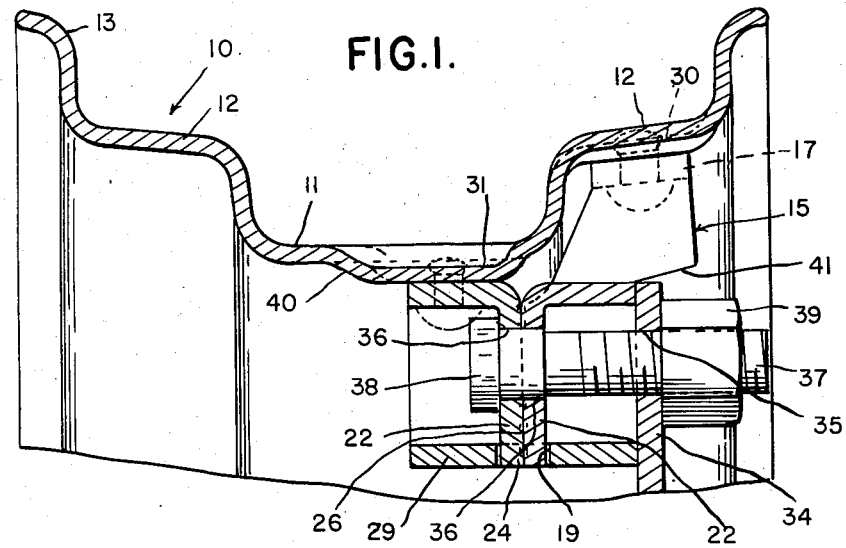
Fig. 1 is a cross section through a wheel rim provided with my improved attachment means for connecting the same to a disk wheel body.
Figure 2:
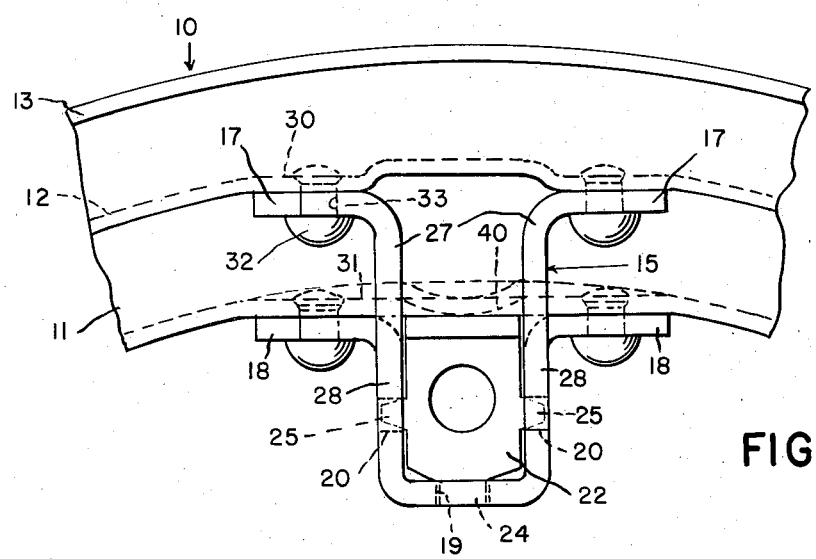
Fig. 2 is a side elevation.

10 is a wheel rim of the type having a drop center 11, bead supporting portions 12 on opposite sides thereof and tire retaining flanges 13. My improved rim attaching means is formed of two elements, each of which is developed by the bending of a flat sheet metal blank, and the two elements when assembled having portions extending in three perpendicular planes. One of these elements 15 is developed from a blank having a substantially rectangular central portion 16 and spaced pairs of portions 17, 17, 18, 18 projecting outward from opposite ends of said central portion. The portion 16 has formed at the center thereof a rectangular aperture 19 and oblong rectangular apertures 20 are also formed in the portion 16 on opposite sides of the aperture 19. The blank is bent along parallel dotted lines 21 into a substantially U-shaped form and the pairs of portions 17, 17, 18, 18 are bent from the sides of the U so as to lie in parallel offset planes. The other member 22 is formed from a pair of like substantially rectangular blanks 23 having a projecting tongue 24 at one end thereof and tongues 25 projecting from opposite sides. Each of these blanks 23 is bent to form a right angle member and the two angle members when placed together form a substantially T-shaped member, the stem of the T being of double thickness with the two portions composing the same spot welded or otherwise secured to each other. The two members 15 and 22 are secured to each other by engaging the tongues 24 with the central aperture 19 and the tongues 25 with the apertures 20. Such engagement is obtained by placing the member 22 within the U of the member 15 before the sides of the U are bent into full parallelism. Thus at the completion of the assembly the two members are inseparably connected to each other. It will also be observed that the stem portion 26 of the member 22 is perpendicular to the parallel side portions 27 of the member 15 and that the flanges 28 of the member 22 are in a plane parallel to the connecting portion 29 of the U. This forms a combined structure which is rigidly braced in three mutually perpendicular planes.

As the wheel rim is of annular form the portions 11 and 12 will be arcuate. I have, however, slightly deformed these arcuate portions to form spaced portions 30 in the bead supporting portion 12 at spaced points lying in the same plane. In the same manner the drop center portion 11 is deformed and slightly inwardly offset to form a flat portion 31. The assembly of the members 15 and 22 is secured to these portions 30 and 31. The flanges 17, which are in the same plane, lie against the portions 30 in the rim and the portions 18 lie against the portion 31. Rivets 32 rigidly attach the assembly to the rim and it is to be noted that all of the rivet holes 33 are parallel to each other so that they can be simultaneously punched or drilled.

The rim has a plurality of the attachment assemblies secured thereto at properly spaced points in its circumference and these form bearings for the wheel body, such as a disk 34. Aligned apertures 35 and 36 are formed respectively in the disk 34 and the portion 20 of the assembly. Bolts 37 pass through these apertures, the bolt head 38 being adjacent to the portion 20 and the nut 39 clamping the disk 34 against the portions 28 and 29 of the member 15 and also against one of the outwardly extending flanges of the member 22. The clamping stress against this flange of the member 22 is carried into the member 15 through the tongues 24 and 25 and, therefore, the two members form a rigid unit rigidly attached to the rim. The disk body of the wheel may be placed on either side of the assembly and similarly attached at each position by the bolts 37.

However, in the one position the disk will be substantially at the center of the rim while in the other position the rim will be laterally offset from the disk.

In mounting a rim on a wheel disk body it is, of course, necessary to register the bolt holes in the disk with those in the members 15. The outside diameter of the disk is usually something less than the inside diameter of the rim which renders it difficult to align these apertures. I have, however, provided means for facilitating such alignment consisting of an incline or cam portion 40 extending from one side of the flattened portion 31 to the arcuate portion of the rim. Thus the disk when placed centrally of the rim can ride up this cam which will bring the bolt apertures in substantial alignment. When the disk is offset from the center of the rim it can ride up cams 41 formed in the member 15.

What I claim as my invention is:

1. Means for attaching a rim to a wheel body comprising an assembly of two elements, one of said elements being of channel form in cross section having flanges extending laterally from the sides of the channel for attaching it to the rim with the channel extending transversely of the rim, the other element being of generally T-shaped form in cross section and having the stem extending within and transversely of the channel and provided with a bolt aperture for attachment to the wheel body and the head extending longitudinally of the channel with one end substantially flush with the corresponding channel end to bear therewith against the wheel body and separate means for locking the stem to the base and the sides of the channel.

2. Means for attaching a rim to a wheel body comprising an assembly of two elements, one of said elements being of channel form in cross section having the base and the sides of the channel provided with apertures and also having flanges extending laterally from the sides of the channel for attaching it to the rim with the channel extending transversely of the rim, the other element being of generally T-shaped form in cross section and having the stem extending within and transversely of the channel and provided with portions extending into the apertures in the base and sides of the channel, the stem being provided with a bolt aperture for attachment to the wheel body, the generally T-shaped element also having the head extending longitudinally of the channel with one end substantially flush with the corresponding channel end to bear therewith against the wheel body.

3. Means for attaching a rim to a wheel body comprising an assembly of two elements, one of said elements being of channel form in cross section having the base and sides of the channel provided with apertures and also having flanges extending laterally from the sides of the channel for attaching it to the rim with the channel extending transversely of the rim, the other element being of generally T-shaped form in cross section and having the stem extending within and transversely of the channel and provided with a bolt aperture for attachment to the wheel body and also provided with tongues projecting from the end and opposite sides thereof and engaging the apertures in the base and sides of the channel, the T-shaped element having the head extending longitudinally of the channel with its ends substantially flush with the channel ends to bear therewith against the wheel body when located at either end of the channel.

JOHN H. PLOEHN.

REFERENCES CITED

The following references are of record in the file of this patent:

UNITED STATES PATENTS

| Number | Name | Date |
| --- | --- | --- |
| 2,294,256 | Uber | Aug. 25, 1942 |